(12) United States Patent
Flin et al.

(10) Patent No.: US 9,085,369 B2
(45) Date of Patent: Jul. 21, 2015

(54) PIVOTING DOOR FOR THRUST REVERSER WITH STABLE INTERMEDIATE POSITION

(75) Inventors: Stephane Flin, Toulouse (FR); Michael Galinier, Toulouse (FR); Benoit Letay, Bouloc (FR); Benjamin Saget, Tournefeuille (FR)

(73) Assignee: Airbus Operations S.A.S., Toulouse (FR)

( * ) Notice: Subject to any disclaimer, the term of this patent is extended or adjusted under 35 U.S.C. 154(b) by 981 days.

(21) Appl. No.: 13/185,954

(22) Filed: Jul. 19, 2011

(65) Prior Publication Data

US 2012/0023900 A1 Feb. 2, 2012

(30) Foreign Application Priority Data

Jul. 20, 2010 (FR) ...................................... 10 55897

(51) Int. Cl.
| | |
|---|---|
| *B64D 29/06* | (2006.01) |
| *F02K 1/70* | (2006.01) |
| *F02K 1/64* | (2006.01) |
| *F02K 1/76* | (2006.01) |

(52) U.S. Cl.
CPC . *B64D 29/06* (2013.01); *F02K 1/70* (2013.01); *F02K 1/64* (2013.01); *F02K 1/76* (2013.01); *Y02T 50/671* (2013.01)

(58) Field of Classification Search
CPC ............... F02K 1/76; F02K 1/64; F02K 1/70; B64D 29/06; Y02T 50/671
USPC ....... 60/226.1, 226.2, 226.3, 230; 244/110 B; 239/265.19, 265.29
See application file for complete search history.

(56) References Cited

U.S. PATENT DOCUMENTS

| | | | | |
|---|---|---|---|---|
| 4,410,152 A | * | 10/1983 | Kennedy et al. ........... | 244/110 B |
| 5,054,285 A | * | 10/1991 | Geidel et al. .................. | 60/226.2 |
| 5,782,434 A | * | 7/1998 | Jean ........................... | 244/110 B |
| 5,794,433 A | * | 8/1998 | Peters et al. .................. | 60/226.2 |
| 5,806,302 A | * | 9/1998 | Cariola et al. .................. | 60/204 |

(Continued)

FOREIGN PATENT DOCUMENTS

| | | |
|---|---|---|
| FR | 2 887 854 | 1/2007 |
| FR | 2 929 998 | 10/2009 |

(Continued)

OTHER PUBLICATIONS

French Preliminary Search Report and Written Opinion issued Jan. 25, 2011, in French 1055897, filed Jul. 20, 2010 (with English Translation of Categories of Cited Documents).

*Primary Examiner* — William H Rodriguez
*Assistant Examiner* — Carlos A Rivera
(74) *Attorney, Agent, or Firm* — Oblon, McClelland, Maier & Neustadt, L.L.P.

(57) ABSTRACT

An aircraft nacelle includes a cowling, an engine housed in an internal volume of the cowling, and at least one thrust reverser, an air passage duct being formed between an internal wall of the cowling and an external wall of the engine. The cowling includes a fixed cowling part and a moving cowling part that is translationally movable between a plurality of positions, at least one of the positions varying an air flow through the duct. The moving cowling part includes the at least one thrust reverser so that translational movement of the moving cowling part also allows the moving cowling part to switch from a position in which the at least one thrust reverser is retracted into a reverse-thrust position in which a bypass flow is deflected to generate a reverse thrust.

9 Claims, 2 Drawing Sheets

(56) References Cited

U.S. PATENT DOCUMENTS

| | | | | |
|---|---|---|---|---|
| 6,082,096 | A * | 7/2000 | Vauchel | 60/226.2 |
| 6,385,964 | B2 * | 5/2002 | Jean et al. | 60/226.2 |
| 6,751,944 | B2 * | 6/2004 | Lair | 60/226.3 |
| 6,804,947 | B2 * | 10/2004 | Le Docte et al. | 60/226.2 |
| 2009/0121078 | A1 | 5/2009 | Marche | |
| 2009/0193789 | A1 | 8/2009 | Pero | |
| 2010/0024387 | A1 * | 2/2010 | Marche | 60/226.2 |
| 2010/0072324 | A1 * | 3/2010 | Teulou | 244/53 R |

FOREIGN PATENT DOCUMENTS

| | | |
|---|---|---|
| GB | 2 372 729 | 9/2002 |
| WO | WO 2008/045070 A1 | 4/2008 |

* cited by examiner

PIVOTING DOOR FOR THRUST REVERSER WITH STABLE INTERMEDIATE POSITION

The present invention belongs to the field of aeronautical engineering and in particular, that of aircraft nacelles. More specifically, the invention relates to an aircraft nacelle for a bypass engine equipped with a variable area nozzle fan cowling, this cowling comprising at least one thrust reverser.

It is known practice for an aircraft to be fitted with nacelles each containing a jet engine for moving the aircraft around on land and in the air. Each nacelle is mounted on the pressure face of the wings. Air is drawn into the nacelle at a front end of this nacelle, situated towards the front of the aircraft. The nacelle rejects the absorbed air at high speed towards the rear of the aircraft.

In order to allow the aircraft to move forwards, it is necessary for a mass of air passing through the nacelle to have an exit speed that is higher than its inlet speed. The exit speed of the mass of air is increased, in the known way, inside the nacelle.

The air passing through the nacelle is made up of two different flows. A first flow, known as the primary flow, passes through the engine. The primary flow is ejected directly from the nacelle at the rear of the engine. A second flow, known as the secondary or bypass flow, passes through an air passage duct before being ejected from the nacelle. The air passage duct is formed between an internal wall of a cowling of the nacelle and an external wall of the engine and extends along the length of the turbojet engine.

It is therefore known practice for these nacelles to be fitted with thrust reversers in order to shorten the landing distance of the aircraft. What is meant by the landing distance of the aircraft is the distance that the aircraft covers between the moment the landing gear touches down on the landing strip and the moment that the aircraft is at a complete standstill on the runway. These thrust reversers deflect all or some of the air flows leaving the rear of the nacelle so that they are ejected towards the front of the aircraft. These thrust reversers thus create aerodynamic drag and therefore a braking force known as "reverse thrust", which plays a part in the slowing-down of the aircraft.

Various thrust reversers such as thrust reversers with pivoting doors or alternatively cascade-type thrust reversers are known from the prior art.

Cascade-type thrust reversers comprise a moving cowling capable of a translational movement to which are attached doors that create the exterior surface of the engine bypass flow.

A nacelle fitted with thrust reversers of the pivoting door type, comprising doors created in the thickness of the cowling of the nacelle, is also known. These doors are distributed about a circumference of the nacelle. In the inactive position the doors are closed, that means that they run in the continuation of the cowling. In the active position, the doors are open. The excursion of the doors is such that part of the doors extends then towards the outside of the nacelle. An axis of pivoting of the doors is distant from a pivoting end of these doors. What is meant by a pivoting end is the end of the doors at which the pivot axis is created. Thus, when the doors are open, the pivoting end of the doors is situated inside the nacelle, and at least partially closes off the air passage duct. The flow of air is therefore impeded, and the air flow is discharged from the nacelle via a passage opened up by the opening of the doors. The part of the doors that extends out of the nacelle is able to direct the flow towards the front of the nacelle in order to generate the braking force.

Thrust reversers are able to reverse the thrust derived from just the bypass flow or the thrust derived from the primary flow and the bypass flow, depending on the position of the doors on the cowling. Specifically, if the openings closed off by the thrust reverser doors are formed on a rear end of the cowling, the primary flow is discharged through these openings, at the same time as the bypass flow. On the other hand, if the openings are formed upstream of the primary flow, only the bypass flow is discharged through the openings in the cowling.

Although effective, these thrust reversers do nothing more than generate a reverse thrust and have no other function when they are in the inactive position.

Moreover, certain engines require variable area nozzle (VAN) fan cowlings to improve their propulsion efficiency under certain flight conditions, for example when the aeroplane is close to the ground. This variation in engine nozzle area can be obtained through a translational or rotational movement of parts.

These systems for reversing thrust and varying the bypass flow nozzle area are separate from one another, and this considerably increases the weight of the nacelle.

Now, this additional weight leads to additional fuel consumption which is incompatible with the economic constraints on airlines.

It is therefore an objective of the present invention to simplify the nacelle and thus to reduce its weight by incorporating the thrust reverser function into the system that varies the nozzle area for the bypass flow.

The objective of the present invention is therefore to propose a nacelle for a bypass engine which is simple in its design and in its mode of operation, this nacelle comprising a single mechanism that performs the functions of reversing thrust and of varying nozzle area.

To this end, the invention relates to an aircraft nacelle comprising a cowling, an engine housed in an internal volume of the cowling and at least one thrust reverser, an air passage duct being formed between the internal wall of the cowling and an external wall of this engine, the cowling comprises a fixed cowling part and a moving cowling part capable of translational movement between a plurality of positions, at least one of these positions varying the air flow through the said duct, the moving cowling part comprising the said at least one thrust reverser so that translational movement of the moving cowling also allows this moving cowling to switch from a position in which the said at least one thrust reverser is retracted into a reverse-thrust position in which the bypass flow is deflected to generate a reverse thrust, the said at least one thrust reverser comprising a pivoting door, it comprises at least two extreme stable positions, a retracted position in which the said door is incorporated into the said cowling, and a reverse-thrust position in which the said door is positioned partially inside and outside the nacelle to divert the bypass flow and to generate reverse thrust, the said moving cowling part then being in a fully displaced position.

According to the invention, when the said moving cowling part is in the said at least one position that varies the air flow through the said duct, the said at least one thrust reverser which comprises a pivoting door has a stable intermediate position in which the portion of the said door that is positioned downstream in relation to the direction of travel of the bypass flow through the nacelle has an excursion directed towards the outside of the nacelle.

What is meant by a "retracted position" is a stable position in which the doors of the thrust reversers are incorporated into the moving cowling part while extending in the continuation of the cowling.

In various particular embodiments of this aircraft nacelle, each of which has its own particular advantages and which can be combined into many possible technical combinations:

with the said at least one thrust reverser comprising a door, the internal surface of the said door has at least one curved portion to deflect the bypass flow in the reverse-thrust direction when the said moving cowling part is in the reverse-thrust position.

Of course, this curved position also allows some of the bypass air flow to be directed towards the rear of the nacelle in the said at least one position that varies the air flow through the said duct.

with the said at least one thrust reverser comprising a door, the said thrust reverser comprises a connecting member pivotally connecting the said door to the external wall of the said engine, the said thrust reversers are formed in the said moving cowling part, being positioned around the circumference of the said nacelle, with the said thrust reversers being distributed non-continuously around the circumference of the said moving cowling part, the said nacelle comprises two groups of four thrust reverser doors, the said doors being diametrically opposed in pairs.

Finally, the invention relates to an aircraft equipped with at least one nacelle as described hereinabove.

The invention will be described in greater detail with reference to the accompanying drawings in which.

Figure 1:
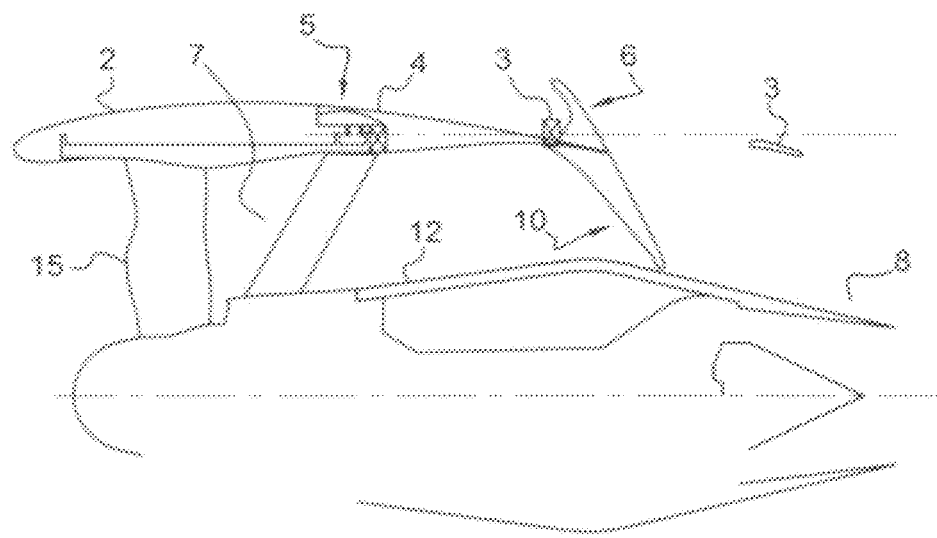
FIG. 1 is a partial view in longitudinal section of a nacelle for a bypass engine in one particular embodiment of the invention, the said moving cowling part being depicted in its two extreme stable positions, namely in its retracted position and in its reverse-thrust position.
Figure 2:
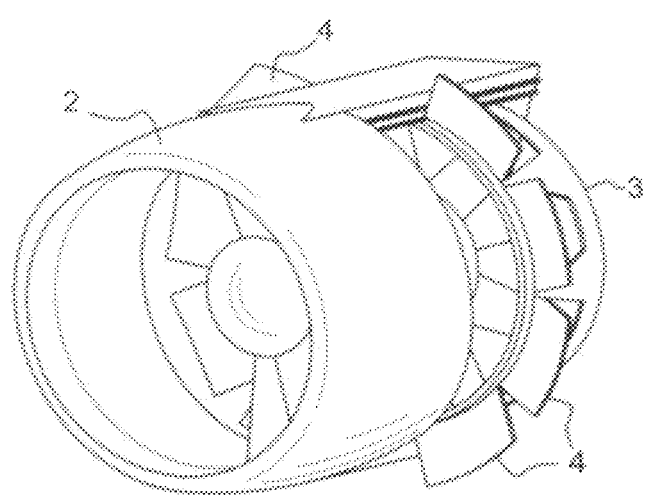
FIG. 2 is a perspective view of the nacelle of FIG. 1 with the said moving cowling part in the reverse-thrust position.
Figure 3A:
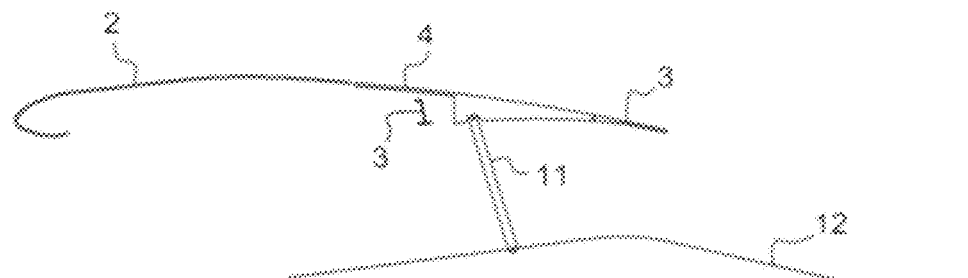
(FIG. 3a), a position for varying the air flow through the passage duct (FIG. 3b) and the reverse-thrust position (FIG. 3c)

FIGS. 1 to 3 show a nacelle for a bypass engine according to one preferred embodiment of the invention. This nacelle comprises a cowling 1 comprising a fixed cowling part 2 and a moving cowling part 3 capable of translational movement along a longitudinal axis of the nacelle.

This nacelle comprises a bypass engine arranged in the internal volume of the nacelle delimited by the cowling 1. The nacelle also comprises a fan 15 arranged inside this internal volume in front of the engine. What is meant by "in front of" or "forward of" is facing towards a cockpit of the aircraft on which the nacelle is to be mounted.

The nacelle is also fitted with thrust reversers each comprising a pivoting door 4. Each one of these doors 4 is incorporated into the front part of the moving cowling 3, being articulated about an orthoradial axis.

FIG. 1 depicts a thrust reverser in two extreme stable positions, a retracted first position 5 and a reverse-thrust position 6.

When the thrust reverser is in its retracted position 5, the corresponding door 4 runs in the continuation of the walls of the fixed 2 and moving 3 cowling parts of the nacelle.

FIG. 2 depicts the moving cowling part 3 of the nacelle in the reverse-thrust position 6. In this position, the moving cowling part 3 has been completely moved, or moved back, with respect to the fixed cowling part 2 of the nacelle.

It may be seen that the thrust reversers are formed in the moving cowling part, arranged on the circumference of the nacelle.

Figure 3B:
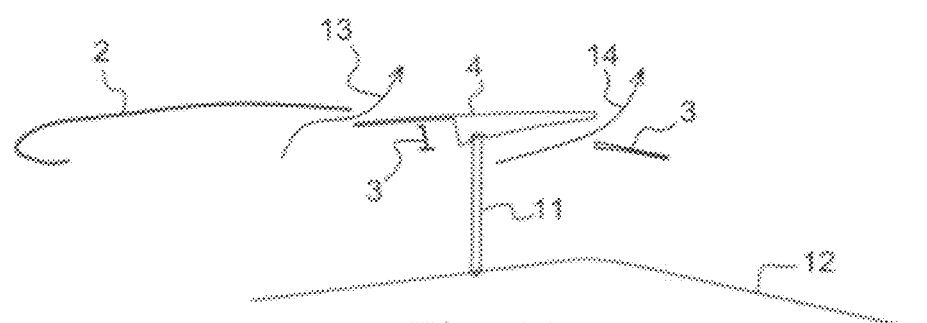
FIG. 3 is an enlarged view of the nacelle of FIG. 1 successively showing three possible positions of the moving cowling part, the retracted position.
Figure 3C:
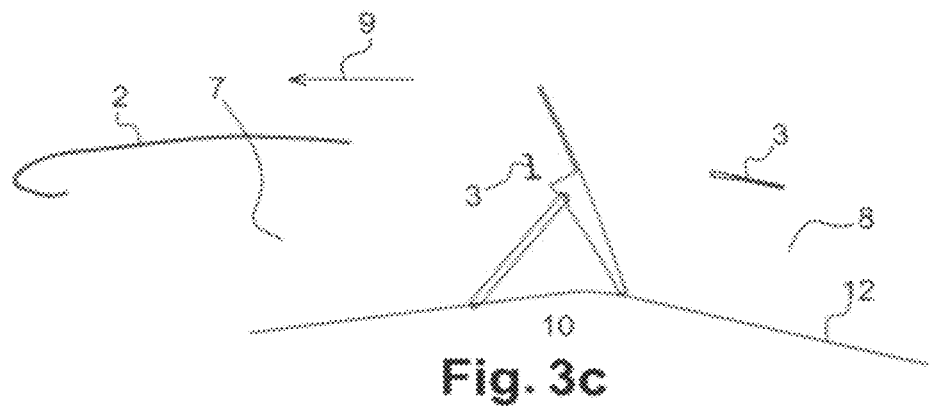

The door 4 of each thrust reverser is positioned partly in the internal volume of the nacelle so as to close off the passage duct 7 for air through which the bypass air flow passes, and partly outside the nacelle (FIG. 1 and FIG. 3c). The bypass air flow can therefore no longer pass towards the rear end 8 of the nacelle in order to be expelled from the nacelle.

Part of the interior surface of the door 4 advantageously has a curved surface 10 so as to deflect the bypass air flow in a reverse-thrust direction 9 by expelling it through the opening uncovered by the open door 4.

The moving cowling part 3 may also adopt an intermediate stable position in which the rear portion of the door has an excursion directed towards the outside of the nacelle (FIG. 3b). This excursion is obtained thanks to the connecting member, in this instance a link rod 11, that pivotably connects this door 4 to the external wall 12 of the engine. This external wall of the engine 12 may be produced by an internal cowling surrounding the said engine.

Advantageously, this intermediate position makes it possible to obtain two auxiliary paths, or additional paths 13, 14 for discharging the bypass flow thus making it possible to vary the nozzle area for this bypass flow through the passage duct 7. A first 13 of these auxiliary paths allows the bypass flow to be deflected between the fixed cowling 2 and the exterior surface of the open door 4. The other auxiliary path 14 allows the bypass flow to be deflected between the interior surface of the open door 4 and the moving cowling 3.

The curved surface part 10 of the interior surface of the door 4 advantageously guides along this additional path a portion of the bypass flow passing through the passage duct 7, towards the rear of the nacelle.

The connecting member 11 accordingly has a number of positions corresponding to the various positions of the thrust reverser door 4. When the pivoting door 4 is in the retracted position, the connecting member 11 is inclined towards the front of the engine. When this door is in the reverse-thrust position, the connecting member 11 is inclined backwards. When the pivoting door is in the stable intermediate position, the connecting member 11 is positioned between the two inclined positions described hereinabove.

The nacelle comprises control means for moving the moving cowling part 3 translationally between the abovementioned positions.

These control means preferably comprise an actuator. Purely by way of illustration, this actuator comprises a telescopic section. This telescopic section can be operated in the known way using a hydraulic, pneumatic or electric power source.

The nacelle also comprises elements for the translational guidance of the moving cowling part 3. Purely by way of illustration, these guide elements comprise rails.

The actuator may further be connected to a control circuit (not depicted) allowing this actuator to be controlled from the cockpit. Alternatively, this actuator may be connected to an automatic control circuit which triggers the movement of the moving cowling part 3 according to the phase of flight of the aeroplane, for example during a landing or takeoff phase.

These control means allow the moving cowling part to be moved from the intermediate position that varies the flow of air through the passage duct into the reverse-thrust position and back again are unique. Advantageously, the switch from one of these positions to the other can therefore be performed very quickly in the event of an RTO (rejected takeoff).

The invention claimed is:

1. An aircraft nacelle comprising:
a cowling, an engine housed in an internal volume of the cowling, and
at least one thrust reverser, an air passage duct being formed between an internal wall of the cowling and an external wall of the engine,
the cowling comprises a fixed cowling part and a moving cowling part that is translationally movable between a plurality of positions, at least one of the positions varying an air flow through the air passage duct, the moving cowling part comprising the at least one thrust reverser so that translational movement of the moving cowling part also allows the moving cowling part to switch from a position in which the at least one thrust reverser is retracted into a reverse-thrust position in which a bypass flow is deflected to generate a reverse thrust, the at least one thrust reverser comprising a pivoting door, the pivoting door comprises at least two extreme stable positions, a retracted position in which the pivoting door is incorporated into the cowling, and a reverse-thrust position in which a surface of the pivoting door that forms a part of an outer surface of the cowling in the retracted position is positioned partially inside and outside the nacelle to divert the bypass flow and to generate reverse thrust, the moving cowling part then being in a fully displaced position, wherein
when the moving cowling part is in the at least one position that varies the air flow through the air passage duct, the at least one thrust reverser which comprises the pivoting door has a stable intermediate position in which a portion of the pivoting door that is positioned downstream in relation to a direction of travel of the bypass flow through the nacelle is positioned outside of the nacelle.

2. The nacelle according to claim 1, wherein, with the at least one thrust reverser comprising the pivoting door, an internal surface of the pivoting door has at least one curved portion to deflect the bypass flow in the reverse-thrust direction when the moving cowling part is in the reverse-thrust position.

3. The nacelle according to claim 1 or 2, wherein, with the at least one thrust reverser comprises a connecting member pivotally connecting the pivoting door to the external wall of the engine.

4. The nacelle according to claim 1, wherein the nacelle comprises an actuator allowing the moving cowling part to be moved in terms of translation between the plurality of positions.

5. The nacelle according to claim 1, wherein the nacelle comprises guide elements guiding the translational movement of the moving cowling part.

6. The nacelle according to claim 1, wherein the thrust reversers are formed in the moving cowling part, being positioned around a circumference of the nacelle.

7. The nacelle according to claim 6, wherein, with the thrust reversers being distributed non-continuously around the circumference, the nacelle comprises two groups of four of the pivoting doors, the pivoting doors being diametrically opposed in pairs.

8. An aircraft equipped with at least one nacelle according to claim 1.

9. The nacelle according to claim 1, wherein in the stable intermediate position
a first path to direct at least part of the bypass flow outside of the nacelle is formed between a leading end of the pivoting door and the fixed cowling part, and
a second path to direct at least part of the bypass flow outside of the nacelle is formed between a trailing end of the pivoting door and the moving cowling part.

* * * * *